United States Patent [19]
Le Dall et al.

[11] Patent Number: 5,694,834
[45] Date of Patent: Dec. 9, 1997

[54] DEVICE FOR FORMING IN SERIES FLAT OBJECTS OF ADJUSTABLE SHAPE AND THICKNESS BY DEPOSITION OF A RELATIVELY FLUID SUBSTANCE ON A SUPPORT

[75] Inventors: Jean-Claude Le Dall, 327, route de l'Empereur, 92500 Rueil-Malmaison; Marcel Madec, Suresnes, both of France

[73] Assignees: Institut Francais Du Petrole; Jean-Claude Le Dall, both of Rueil-Malmaison, France

[21] Appl. No.: 636,758

[22] Filed: Apr. 19, 1996

[30] Foreign Application Priority Data

Apr. 20, 1995 [FR] France ................... 95/04862

[51] Int. Cl.⁶ .................. B29C 47/30; A21C 9/00
[52] U.S. Cl. .................. 99/353; 99/427; 425/382.3
[58] Field of Search .............. 99/353, 352, 427, 99/380, 381; 425/382.3, 326.1, 377

[56] References Cited

U.S. PATENT DOCUMENTS

| | | | |
|---|---|---|---|
| 4,583,451 | 4/1986 | Kanagy | 99/423 |
| 4,733,608 | 3/1988 | Merdy | 99/423 |
| 5,013,498 | 5/1991 | Froeschke | 425/382.3 X |
| 5,077,072 | 12/1991 | Sieradzki | 99/443 C X |
| 5,244,370 | 9/1993 | DeMars | 99/353 X |
| 5,382,145 | 1/1995 | Harreither | 425/382.3 X |
| 5,487,862 | 1/1996 | Foresman | 425/382.3 X |

FOREIGN PATENT DOCUMENTS

| | | |
|---|---|---|
| 1578102 | 8/1969 | France . |
| 2137052 | 12/1972 | France . |
| 2173433 | 10/1973 | France . |

*Primary Examiner*—Reginald Alexander
*Attorney, Agent, or Firm*—Antonelli, Terry, Stout & Kraus, LLP

[57] ABSTRACT

A device for forming in series flat objects and notably thin cakes of particular shape, on any application wall, from a substance of sufficiently fluid consistency is disclosed. The device comprises a hollow feeding drum mounted rotatably on a hollow shaft, suited to be placed in contact with application surface, the surface of the feeding drum comprising at least one opening whose shape is selected in accordance with the shape to be given to each flat object. A feeding system is connected to the shaft for feeding the fluid substance into the drum comprising a radially extending spreading element for applying the fluid substance onto the application surface through the opening. The radially extending spreading element communicates with the inside of the shaft and is set radially between the shaft and the inner face of the drum wall. A guide is provided for keeping the radially extending spreading element in contact therewith.

23 Claims, 4 Drawing Sheets

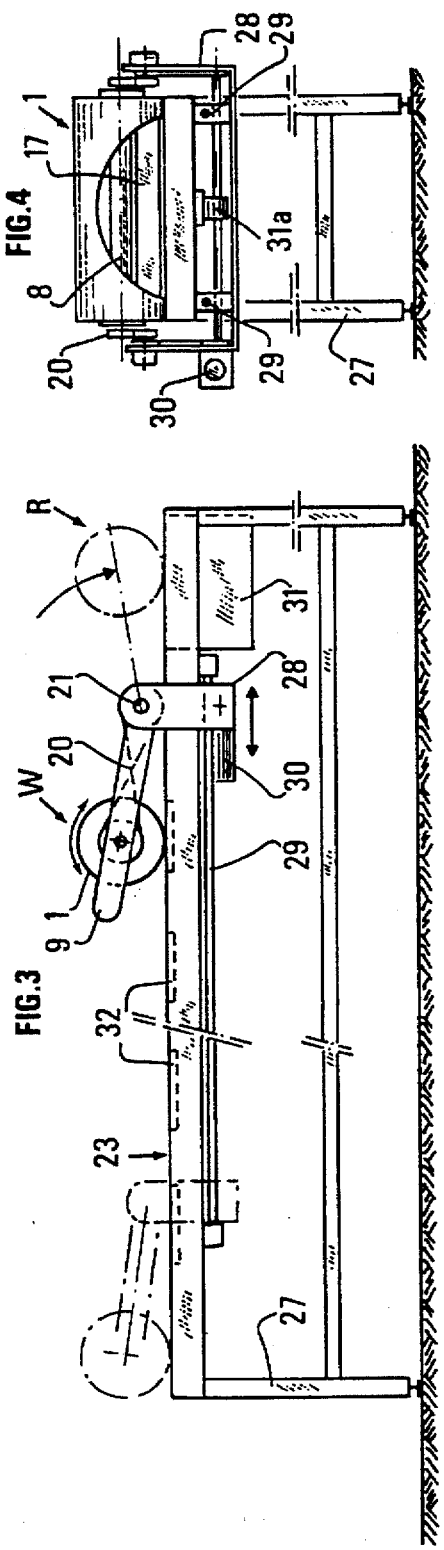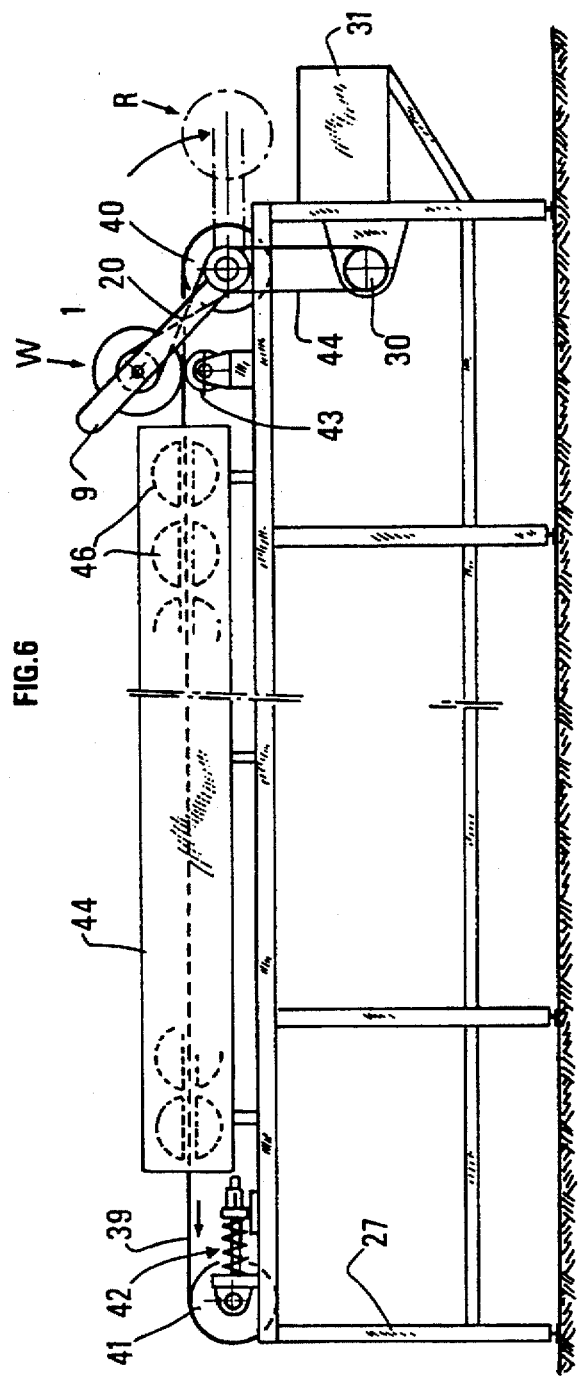

DEVICE FOR FORMING IN SERIES FLAT OBJECTS OF ADJUSTABLE SHAPE AND THICKNESS BY DEPOSITION OF A RELATIVELY FLUID SUBSTANCE ON A SUPPORT

BACKGROUND OF THE INVENTION

1. Field of the Invention

The present invention relates to a device for making in series, on any support, disks of adjustable thickness formed from various substances of relatively variable fluid consistency such as creamy, pasty, powdery, etc.

The device has application to many fields, notably to production sequences for the manufacture of filtration disks or disks made from refractory materials such as ceramics, or to the electronics industries for applying photosensitive varnishes on circuits, or solder paste prior to welding operations.

The device according to the invention has interesting applications in the food industries, notably for the automated production of pancakes or of buckwheat cakes, etc.

2. Description of the Prior Art

Various examples of devices for making pancakes or buckwheat cakes are notably described in patent French patent 2,590,388 or in U.S. Pat. Nos. 4,583,451, 4,733,608 or 5,077,072.

SUMMARY OF THE INVENTION

The device according to the invention enables flat objects to be formed in series, notably thin cakes of particular shape, on any application surface, from a substance exhibiting a sufficient fluid consistency.

The invention comprises a feeding drum mounted rotatably on a shaft, suited to be placed in contact with the application wall, the wall of the feeding drum including at least one opening whose shape is selected in keeping with the shape to be given to each flat object, a feeder, connected to the shaft, for feeding a fluid substance into the drum, a plane distribution element for canalizing and for applying the fluid substance on the application surface through the opening, the distribution element, communicating with an inside of the shaft, and being placed radially between the shaft and the inner face of the drum, and a guide for holding the distribution element in contact with the drum.

According to an embodiment of the invention, the feeder for feeding the fluid substance includes a vessel containing the substance, that is connected to the inside of the shaft and is provided with at least one radial opening for provides communication between the inside of the shaft and the inside of the feeding drum.

The invention advantageously comprises a pumping circuit including the vessel, which causes the fluid substance to circulate continuously along the distribution element.

The distribution element is for example associated with the shaft and includes for example two plates situated on either side of the opening, defining with each other, in the vicinity of a zone of contact with the inner wall of the drum, a relatively narrow groove, and the element is guided by a guide associated with the shaft, that is suited to press the groove against the inner wall of the drum.

The guide includes for example at least one bushing whose cross section is suited to that of the axial opening in the shaft.

In order to facilitate the cleaning thereof, the distribution element preferably comprises housings for the guide means allowing them to be uncoupled from the shaft.

According to an embodiment, the device comprises for example two supporting arms secured to a swivel pin, allowing the drum to be tipped over between a working position in contact with the application surface and a release position, and motive device for shifting the feeding drum without slippage with respect to the application surface.

According to a first mode of implementation, the application surface is the surface of an elongated table, the swivel pin of the two supporting arms is secured to a carriage that can be shifted with respect to the table, the motive device includes a geared motor co-operating with synchronized elements for driving the drum into rotation and the carriage into translation, such as for example a driving belt for driving the drum and a rack for driving the carriage into translation with respect to the table.

According to a second mode of implementation, the application surface is the surface of a cylinder on which the feeding drum rests in the working position thereof, and the motive device includes for example elements for driving the cylinder and the drum into synchronized rotation in opposite directions with respect to each other, for example a geared motor co-operating with a driving strap intended to drive the drum.

According to a third mode of implementation, the application surface is the surface of an endless belt conveyor on which the feeding drum rests in the working position thereof, the motive device including synchronized elements for driving the drum into rotation and the belt conveyor into translation.

The device can further include a device for cooking the flat objects after the deposition thereof on the application surface such as hotplates positioned as a function of the distribution of the substance depositions by the feeding drum, or an infrared radiation cooking tunnel, associated with the belt conveyor, that is preferably suited to be radiated with the infrared rays.

The device can also advantageously comprise a washing a device and a device for shifting the feeding drum between a working position in contact with the application wall and a position of rest in the neighborhood of the washing device.

According to a mode of implementation, the feeder for feeding the substance into the feeding drum includes a temperature regulator that can be associated with the vessel containing the substance so as to vool it, to chill it or to preheat it, as the case may be, and/or installed in a closed circuit between the vessel and the feeding drum for example so as to provide a set temperature value thereon.

According to another embodiment, the device can comprise a device for shifting the ramp angularly with respect to the application surface.

The invention has many advantages. The invention is simple in design, is easy to use, is serviceable, and it is relatively inexpensive. The shape and the thickness of the flat objects produced such as disks, cakes, etc, are even. According to the modes of implementation of the feeding drum, the quantity of Hat objects that can be manufactured can be varied in large proportion, so that the invention is suitable for craftsman's applications as well as for industrial applications.

BRIEF DESCRIPTION OF THE DRAWINGS

Other features and advantages of the invention will be clear from reading the description hereafter of embodiments given by way of non limitative examples, with reference to the accompanying drawings in which:

FIG. 3 shows a first embodiment of the invention with a substance feeder suited to deposit flat objects such as cakes, at regular intervals, on a flat support is on which it rolls;

FIG. 4 and 5 show a second embodiment of the invention with a substance feeder suited to deposit flat objects on a cylindrical support on which it rolls;

FIG. 6 shows a third embodiment of the device with a substance feeder suited to deposit flat objects at regular intervals on a belt conveyor passing through a cooking tunnel.

DESCRIPTION OF THE PREFERRED EMBODIMENTS

The disks or cakes are described hereinafter are examples of flat objects that can be manufactured with the the invention.

Figure 1:
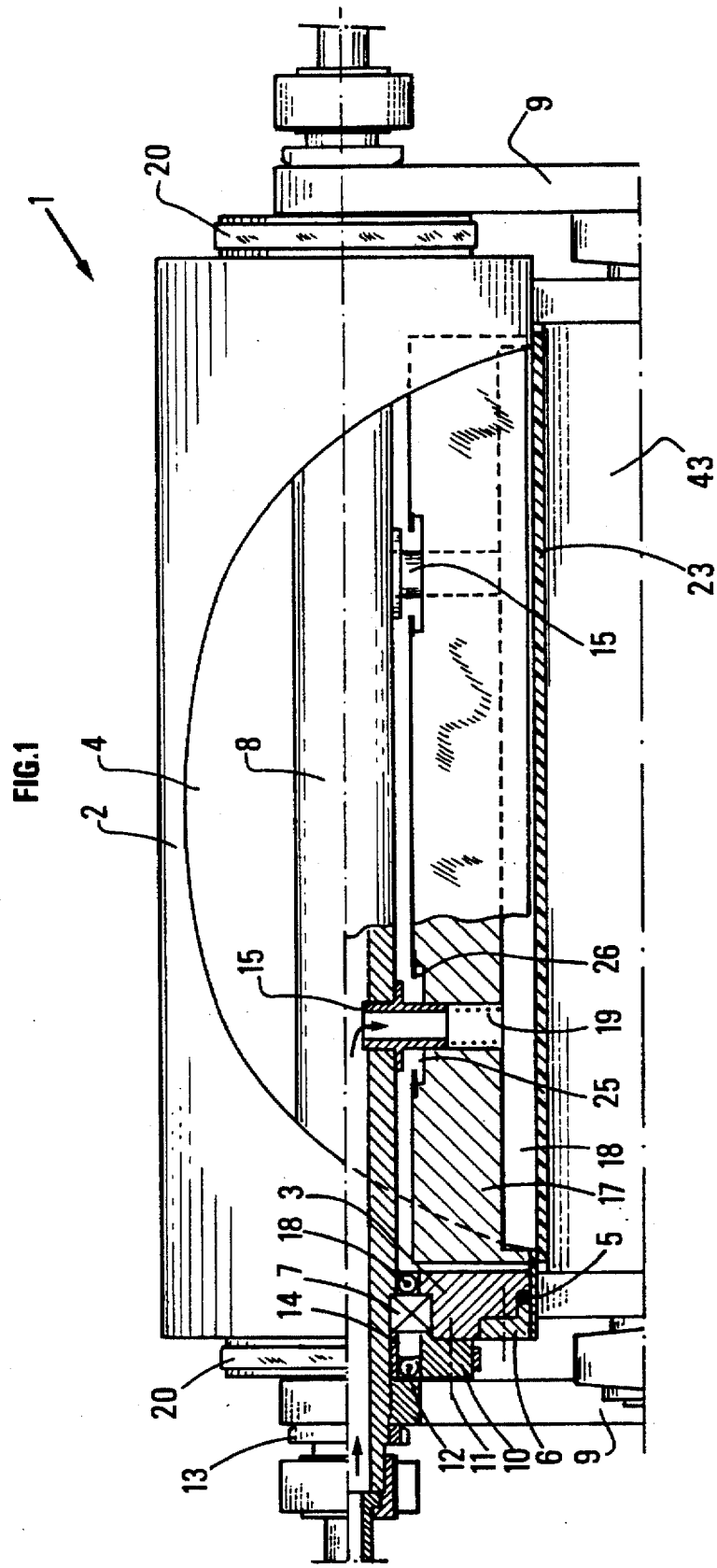
FIG. 1 shows a longitudinal section of a substance feeder seen from the front.

The feeder illustrated in FIG. 1, is suitable for the manufacture of any flat object and comprises an outer drum or rotor 1 including a tube 2 ending at the two opposite ends thereof with two flanges 3. The thickness of the outer wall of tube 2 is selected as a function of the thickness of the disks or cakes to be deposited. An opening 4 whose shape is suited to that of the disks or cakes to be deposited, for example a circular opening, is provided in the wall of tube 2. Doughnut shaped gaskets 5 made of an elastomer for example, that are compressed by tampers 6 screwed in the two flanges 3, secure the gaskets to tube 2.

Drum 1 is mounted rotating, by means of two ball bearings 7, on a fixed hollow shaft 8 supported by two arms 9. The outer cages of the two ball bearings 7 are secured to the flanges 3 by caps 10 fastened through the action of screws 11, with lip seals 12 forming a seal. The inner cages of these ball bearings 7 are secured to shaft 8 through the action of nuts 13 acting axially through supporting arms 9, on braces 14.

Two tubular guides 15 externally provided with seals 16 are placed in openings provided radially in shaft 8. A distribution ramp 17 (FIG. 2) having two parallel plates secured to each other, advantageously made of an antifriction temperature-resisting plastic material, freely, slides on these two guides 15. The two plates of ramp 17 define a groove 18 that is pressed against the inner face of drum 1 through the action of springs 19 resting against a terminal face of the two guides 15.

The tubular guides 15 communicate the inside of shaft 8 with the inner face of drum 1 between the two plates of ramp 17.

Drum 1 is driven into rotation by means of a serrated driving belt 20 running around cap 10. The supporting arms 9 can swivel around a pin 21 secured to a rigid frame 22 (FIGS. 3–5) between a working position W where drum 1 rests on a surface 23 so as to deposit disks or cakes thereon, and a position of rest R, and this wall can be plane (FIGS. 3, 5) or cylindrical (FIG. 4), according to the embodiments and/or the applications.

The fluid substance to be deposited is fed through the inside of shaft 8 and flows through tubular guides 15 and groove 18 into the distribution ramp 17 and spreads over application surface 23 through the opening 4 in drum 1. The substance can circulate simply by gravity or by means of a pump (not shown) for example. Once spread and distributed by the lips of groove 18 after leaving ramp 17, the substance deposited on surface 23 takes the shape of opening 4 and the thickness thereof and is in direct connection with the thickness of the wall of drum 1. The rate of injection of the fluid substance is regular so as to prevent any stagnation.

Since the fluid substances to be deposited can be sensitive to various pollutions, which is notably the case of foodstuffs, it is important that the feeding drum can be easily cleaned. To that effect, each guide includes a profiled collar 24 (FIG. 2) that is normalled pressed against shaft 8 by springs 19. The distribution ramp is provided with housings 25 for each of the collars 24, deep enough to allow complete release of guides 15 from shaft 8. Dowels 26, under which each of the profiled collars 24 can be locked through the rotation of guides 15 about their axis, are fastened to ramp 17. Once distribution ramp 17 released from the shaft, it can be extracted out of drum 1 through opening 4.

According to the embodiment of FIGS. 3 and 4, frame 22 comprises an elongated table 27 whose surface forms the application surface 23. The arms 9 associated with drum 1 are fastened to a carriage 28 that can slide along the table along cylindrical rails 29. A geared motor 30 (FIG. 4) drives a gear wheel 31 associated with carriage 28 that meshes with a rack 31A fastened to table 27 parallel to the longitudinal axis thereof. The same geared motor 30 drives feeding drum 1 by means of serrated belt 20. A wash tank 31 is preferably situated at one end of table 27, above which the feeding drum in the position of rest R thereof can be positioned.

The drum is tipped over in the working position W thereof at one end of table 27 and the geared motor 30 is operated so as to obtain a translation of carriage 28 combined with a rotation of feeding drum 1. The fluid substance injected at the same time by shaft 8 (FIG. 1) is deposited on table 27 with a distribution that depends on the shape of opening 4 if there is a single opening or on the distribution of a plurality of openings. Carriage 28 is thereafter brought back into its initial position for a new cycle.

For some applications where the disk manufacturing procedure requires cooking, notably for the making of pancakes, several hotplates 32 are placed along the table at fixed intervals depending on the diameter of the feeding drum, and the latter is so positioned so that the fluid substance is deposited in the place where the hotplates 32 are situated.

Figure 5:
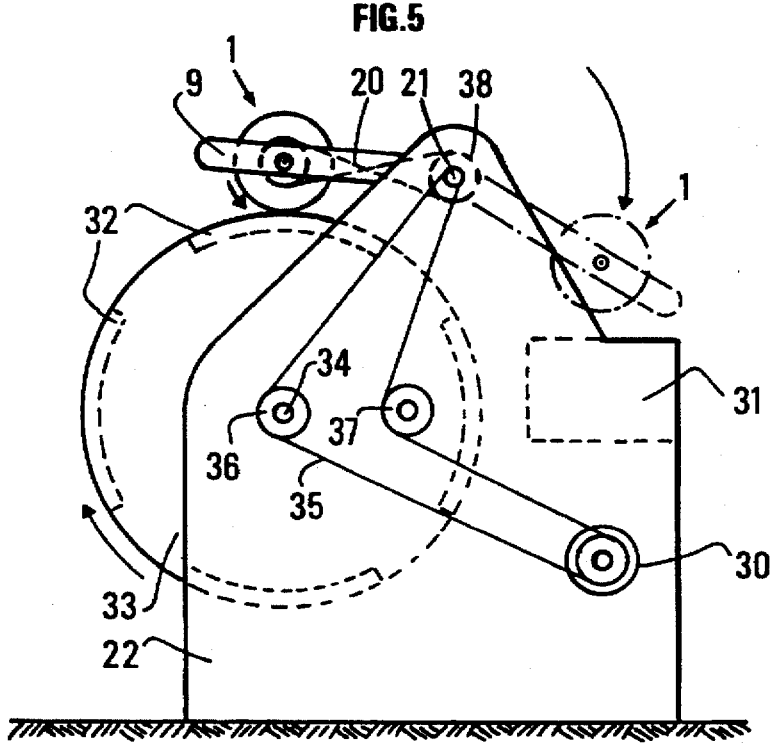

According to the manufacturing method of FIG. 5, the formation of disks or cakes is made continuous by using a deposition surface of a cylindrical shape. The feeding drum 1, in working position W, rolls on a cylinder 33 positioned horizontally, whose axis 34 is supported by frame 22. The supporting arms are connected to axis 21 that can swivel with respect to frame 22 between the working position W thereof and a position of rest R where feeding drum 1 is also positioned above wash tank 31. The geared motor 30 causes cylinder 33 and feeding drum 1 to rotate in the opposite direction with respect to each other. Drive is achieved with the aid of a belt 35 that drives a wheel 36 secured to the axis 34 of cylinder 33 by means of an idler wheel 37 and a wheel 38 secured to the swivel axis 21 of the arms, and of the serrated belt 20 that drives drum 1.

For applications where the procedure for manufacturing disks or cakes also requires cooking, at least one hotplate 32 is placed on the circumference of cylinder 33 with spaces selected as a function of the diameter of the drum and of the opening(s) 4 thereof, so that the fluid substance is deposited where they are. Known devices (not shown) such as an electric brush collector allow the hotplates to be supplied with electric power. This embodiment is suitable for a continuous manufacturing procedure.

At least one infrared ray cooking device (not shown) can also be positioned above table 27 or around the cylinder 33 of the device according to the embodiments of FIGS. 3–5, so as to cook the disks deposited on both sides, if required by the application.

Production of disks or cakes on a larger scale can be obtained by implementing the embodiment of FIG. 6. The feeding drum rolls on an endless belt conveyor 39 stretched between two rollers 40 and 41 mounted rotating at the opposite ends of table 27. The tension of the conveyor can be adjusted by a spring tensioning element 42. The conveyor runs between drum 1 and a free bending roller 43 supported by frame 22. The geared motor 30 drives one of the rollers 40 into rotation by means of a belt 44, and the roller communicates the motion thereof to drum 1 by means of serrated belt 20.

A removal device (not shown) can be placed at the end of the conveyor, close to roller 41, in order to detach and to remove the disks or cakes formed.

For applications where the procedure for manufacturing disks or cakes also requires cooking, the belt conveyor 40 passes through a cooking tunnel 44 equipped with infrared cooking ramps 46. In this case, the conveyor is preferably made from a material transparent to infrared waves, such as a glass fabric coated with a fluorinated plastic.

The rate of progression of belt conveyor 40 and the heating power are so adjusted that the disks or cakes reach a sufficient cooking point at the end of the tunnel.

Embodiments have been described in which the fluid substance can circulate along the hollow shaft 8 and flow through the tubular guides 15 to the application zone. This delivery mode can be replaced by the mode described hereunder without departing from the scope of the invention.

Figure 7:
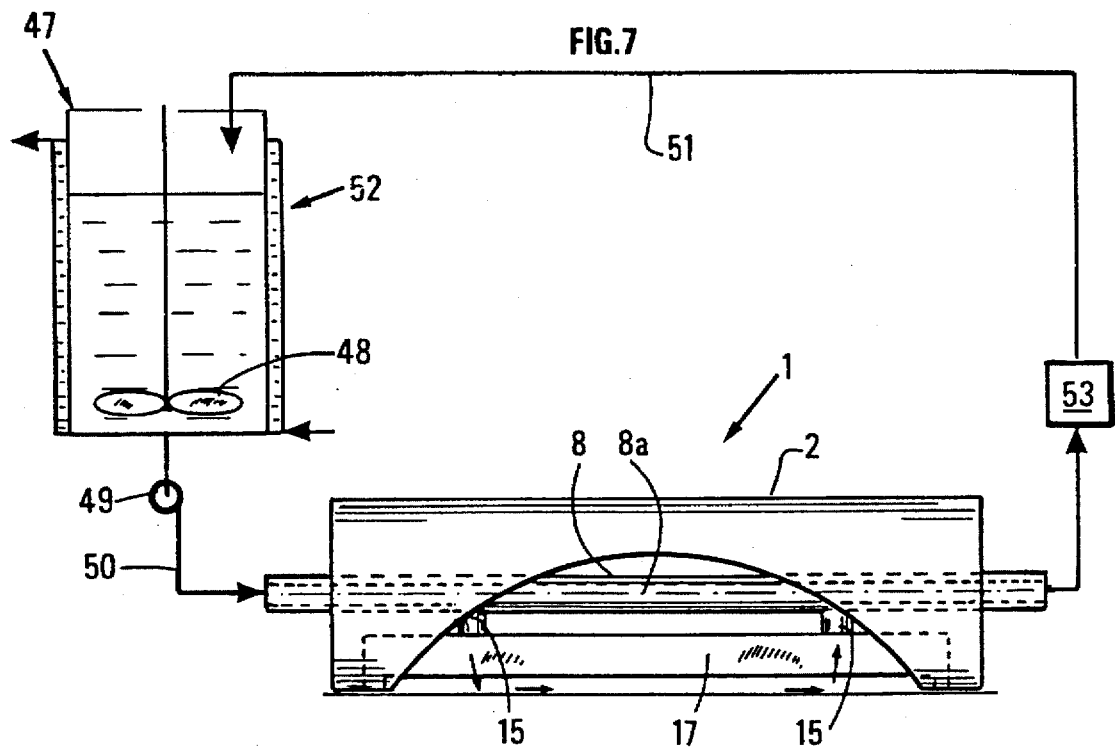
FIG. 7 shows an embodiment of a system for supplying the feeder continuously with the substance to be deposited.

According to this mode, the device comprises a delivery system schematized in FIG. 7, suited to establish a continuous circulation of the batter at the level of the zone of contact between distribution ramp 17 and the inner face of drum 1. It includes a vessel 47 for the batter or substance, means 48 for stirring the substance in vessel 47 and a closed pumping circuit connected to feeding drum 1. This circuit comprises a pump 49 of peristaltic type for example, interposed on a tube 50 connecting the pump to a first end of the axial pipe 8a.

The substance supplied is diverted by a first one of the two tubular guides 15 towards distribution ramp 17. It circulates along the zone of contact between the base of ramp 17 and either the deposition plate accessible through the opening 4 of tube 2 (in the places provided for deposition and cooking), or the inner wall of tube 2 between the places provided. The non deposited fluid substance, including the excess fluid substance in the deposition places provided, is collected at the level of the second tubular guide 15 and feed back into the axial channel 8a of the shaft, to which a second tube 51, that brings it back into vessel 47, is connected.

This continuous fluid substance circulation prevents clogging of the deposition zone due to any excess fluid substance. The fluid substance is therefore evenly distributed, which allows disks or cakes of homogeneous dimensions and quality to be produced.

This diversion of the substance circulation towards the deposition zone can be obtained by partitioning the hollow shaft 8 at the junctions towards the tubular guides 15, or by using a solid shaft in whose axis portions channels are pierced of sufficient length to establish communication with guides 15.

The device can include a heat regulation device 52 designed for the temperature regulation of vessel 47, suited to the application. It may be a cooling or a chilling element if it is useful to keep the substance well-preserved, notably in the food industry, either if it has to be cooled prior to recycle during operation, or between two periods of duty of the device so as to spare any decanting operation.

The heat regulation device 52 may also be a device for preheating the substance in order to bring it to a predetermined temperature necessary to bring it to a certain degree of fluidity or of consistency.

The heat regulation device can also include a heat exchanger 53 situated in the circuit at the level of tube 51 for example, intended to reduce or to bring the circulating substance up to a set temperature.

Figure 8:
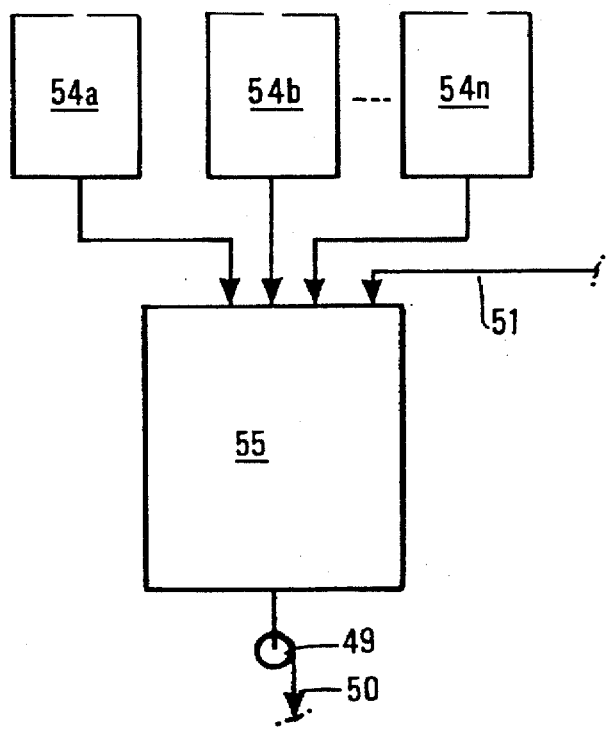
FIG. 8 schematically shows an embodiment of a substance feeder including mixing means for several components.

According to another embodiment suitable for applications where the fluid substance to deliver results in a mixing of components which are likely to interact with each other, the delivery system can include (FIG. 8) n different vessels 54a . . . 54n each for the different components communicating with a mixing chamber 55 feeding the preceding pumping circuit 49–51. This embodiment is suitable notably for substances formed by polymerization.

Figure 2:
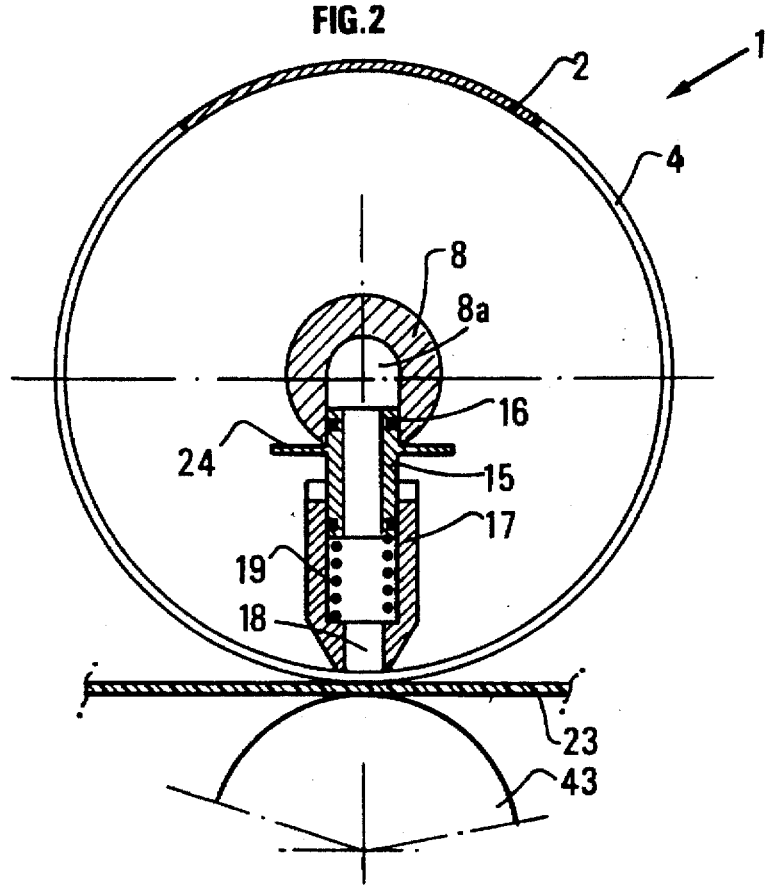
FIG. 2 shows a cross-section of the substance feeder.

Various embodiments have been described where distribution ramp 17 is oriented perpendicular to the substance application surface (see FIG. 2). However, without departing from the scope of the invention, shaft 8 can be made rotating so as to shift angularly the distribution ramp (to tilt it laterally) with the effect of varying the space between the lips of groove 18, and as a result variation in the thickness of the disks deposited on application surface 23 is possible.

Embodiments have been described where the feeding drum comprises a single opening 4 and two hollow guides 15 for injecting the substance to be applied. However, without departing from the scope of the present invention, several openings can be provided with a peripheral and lateral spacing suited for another application, and the number and the shape of the openings that communicate the channel inside shaft 8 with the inside of the feeding drum can also be changed.

We claim:

1. A system for forming a series of flat objects of a determined shape on an application surface from a fluid substance comprising:

a forming device including a hollow feeding drum having a peripheral wall and provided with at least one opening shaped in accordance with the determined shape for feeding the fluid substance to the application surface;

a stationary hollow shaft with an interior duct and at least one opening, the hollow shaft receiving the fluid substance and conveying the fluid substance through the interior duct to the at least one opening;

a radially disposed assembly, releasably coupled to the stationary hollow shaft, for distributing the fluid substances radially outward from the at least one opening of the stationary hollow shaft into an annular space between the stationary hollow shaft and an interior of the hollow feeding drum and including a radially extending spreading element including dual opposed radial plates which define an opening therebetween inside the hollow feeding drum through which the fluid substance to be spread flows through the at least one opening onto the application surface and a guide, associated with each of the at least one opening, each guide for maintaining the radially extending spreading element in contact with the peripheral wall.

2. A system in accordance with claim 1, wherein the radially disposed assembly includes a vessel for containing the fluid substance, the vessel being coupled to the stationary hollow shaft and the at least one opening is a radial opening.

3. A system in accordance with claim 2, further comprising:
   a distribution system including a pump, coupled to the vessel and the stationary hollow shaft, for pumping the fluid substance from the vessel to the radially extending spreading element.

4. A system in accordance with claim 1, wherein:
   the at least one opening of the stationary hollow shaft is at least one radial port coupling the interior duct to the radially disposed assembly; and
   the guide includes at least one bushing, each bushing being housed in a different one of the at least one radial port.

5. A system in accordance with claim 4, wherein:
   the radially extending spreading element comprises a housing for each guide and a clamp associated with each guide for permitting each guide to be released from the hollow shaft.

6. A system in accordance with claim 1, further comprising:
   two supporting arms secured to an axis allowing the hollow feeding drum to be moved between a working position in contact with the application surface and a released position.

7. A system in accordance with claim 6, further comprising:
   a mechanism for moving the hollowing feeding drum without slippage relative to the application surface.

8. A system in accordance with claim 7, further comprising:
   an elongated tube, the application surface being a surface of the tube;
   a carriage displaceable with respect to the tube;
   the axis supporting rotation of the supporting arms is secured to the carriage; and
   the mechanism for moving including synchronizing elements for driving the hollow drum into rotation and the carriage into displacement with respect to the tube.

9. A system in accordance with claim 7, further comprising:
   a cylinder, the application surface being an outer surface of the cylinder, the mechanism for moving including elements for driving the cylinder and the hollow feeding drum into synchronized rotation in an opposite direction with respect to each other.

10. A system in accordance with claim 7, further comprising:
    an endless belt conveyor, the application surface being a surface of the belt conveyor and the mechanism for moving including elements for driving synchronously the hollow feeding drum into rotation and the conveyor belt into translation.

11. A system in accordance with claim 8, wherein:
    the mechanism for moving includes a geared motor driving a belt coupled to the hollow feeding drum and a rack for driving the carriage into-displacement with respect to the tube.

12. A system in accordance with claim 10, wherein:
    the mechanism for moving includes a geared-motor driving a belt for driving the hollow feeding drum.

13. A system in accordance with claim 1, further comprising:
    at least one cooking device for cooking the flat objects which are deposited on the application surface.

14. A system in accordance with claim 13, wherein:
    the at least one cooking device is at least one hotplate positioned on the application surface.

15. A system in accordance with claim 14, further comprising:
    at least one other cooking element.

16. A system in accordance with claim 10, further comprising:
    an infrared tunnel with the endless belt conveyor being radiated with infrared energy while in the infrared tunnel.

17. A system in accordance with claim 1, further comprising:
    a washing device; and
    a device for shifting the hollow feeding drum between a working position in contact with the application surface and a position of rest proximate to the washing device.

18. A system in accordance with claim 1, wherein the hollow feeding drum comprises:
    a tube;
    flanges rotatable with respect to the hollow support shaft for supporting the tube at each end thereof;
    gaskets; and
    two flanges which respectively deform the gaskets against an inner wall of the tube.

19. A system in accordance with claim 3, further comprising:
    a temperature regulation system, associated with the distribution systems, for regulating the temperature of the fluid substances in a part of the distribution system.

20. A system in accordance with claim 2, further comprising:
    a temperature regulation system associated with the vessel, for regulating the temperature of the fluid substance in the vessel.

21. A system in accordance with claim 19, further comprising:
    a device for angularly shifting the hollow shaft to angularly shift the radially extending spreading element relative to the application surface to vary a thickness of the objects.

22. A system in accordance with claim 3, wherein the distribution system comprises:
    a mixing system for mixing together a plurality of components to form the fluid substance.

23. A system in accordance with claim 1, further comprising:
    a distribution system including a pump for pumping the fluid substance to cause the fluid substance to continuously circulate in the radially extending spreading element transversely with respect to the application surface.

* * * * *